United States Patent [19]

Smith

[11] Patent Number: 5,774,999
[45] Date of Patent: Jul. 7, 1998

[54] TREE MARKER

[76] Inventor: Lawson R. Smith, Rte. 2 Box 1330, Glennville, Ga. 30427

[21] Appl. No.: 589,396

[22] Filed: Jan. 22, 1996

[51] Int. Cl.⁶ .................................................. G01B 3/10
[52] U.S. Cl. .......................... 33/555.4; 33/758; 33/759; 24/580; 47/24
[58] Field of Search ............................ 33/514.1, 555.1, 33/555.4, 521, 158, 159, 164; 40/645, 665; 47/24; 24/580, 581

[56] References Cited

U.S. PATENT DOCUMENTS

| | | |
|---|---|---|
| 947,879 | 2/1910 | Worstall ............................ 33/514.1 |
| 2,191,808 | 2/1940 | Schramm ............................ 40/665 |
| 2,554,105 | 5/1951 | Heinle . | |
| 2,642,684 | 6/1953 | Watts . | |
| 3,197,830 | 8/1965 | Hoadley . | |
| 3,775,882 | 12/1973 | Wheeler . | |
| 4,428,385 | 1/1984 | Morales ............................ 33/555.4 |
| 4,441,258 | 4/1984 | McDaniel et al. .................. 33/759 |
| 4,570,368 | 2/1986 | Stover . | |
| 5,167,086 | 12/1992 | Fast . | |
| 5,315,774 | 5/1994 | Chompff . | |

FOREIGN PATENT DOCUMENTS

| | | | |
|---|---|---|---|
| 319335 | 11/1902 | France ............................ 33/555.4 |
| 473354 | 3/1929 | Germany .......................... 33/555.4 |
| 3467 | of 1913 | United Kingdom ................ 33/555.4 |

*Primary Examiner*—G. Bradley Bennett
*Attorney, Agent, or Firm*—Brian D. Bellamy

[57] ABSTRACT

An embodiment of a new tree marker is disclosed that endures time by providing a flexible band with a sheath about a first end. The band wraps around a tree, and a second end of the band attaches to the sheath. The band slides within the sheath as the tree grows. A duplex nail is driven through the sheath to secure the band to the tree.

14 Claims, 4 Drawing Sheets

TREE MARKER

BACKGROUND OF THE INVENTION

This invention relates to a tree marker, one particularly adapted to marking trees along boundary lines while permitting the tree marker to expand to accommodate a tree as it grows.

The method of marking trees in common use today is simply a paint ring around chosen trees. The paint rings are painted onto the trees manually by a crew of men. The paint rings disappear over time as a result of weather and are further faded over time by growth of the trees that causes the paint rings to expand and have less density. Likewise, the paint rings are further damaged over time by the growth of new bark on the trees that conceals the paint and obscures the markings on the trees. For these reasons, the paint rings must be scraped off of the trees periodically and replaced by new paint rings. The process of removing the old paint rings and repainting new rings is labor intensive, time consuming, and wasteful. The timber and forestry industries lose financially as a result of this labor consuming and costly enterprise.

One object of the present invention is to provide a tree marker that is simple in design and economical to construct, yet which effectively marks trees. Another object of the invention is to provide a tree marker that reduces labor and material costs to the tree industry for marking tree boundaries. Another object of the invention is to provide a tree marker that adapts to the growth of a tree. Another object of the invention is to provide a tree marker that is reusable and recyclable. A further object is to provide such a construction that the tree marker does not deteriorate or corrode over time. These and further objects of the invention will be apparent from the following description of preferred embodiments thereof.

BRIEF DESCRIPTION OF THE INVENTION

The present tree marker includes a band for wrapping around a tree, and a partial sheath connected together through a slot in a slotted end of the band to form an adjustable sliding mechanism. After the band is wrapped around a tree, an unslotted end of the band is fastened to the sheath on the slotted end of the band. The band slides within the sheath as the tree grows, allowing the circumference of the tree marker to expand to accommodate the circumference of the tree. Preferably, the band of the tree marker is three to four feet in length to accommodate an average size pine tree. The length of the band can vary according to the type of tree to be marked. The marker may include means to secure the marker to a tree while still permitting the marker to expand as the tree grows. These means for securing the marker to the tree may include a duplex nail having a spring that presses against the band, or a series of bumps or flanges between the sheath and band that create friction causing the band to resist sliding within the sheath, thus keeping the band fit snugly around the tree while allowing the band's circumference to expand as the tree grows.

BRIEF DESCRIPTION OF THE DRAWINGS

The invention is further described in connection with the accompanying drawings.

DETAILED DESCRIPTION

The present invention is a simple and economical tree marker that eliminates many of the disadvantages of painted tree marks. While the tree marker can be made a variety of sizes to fit any size tree, a tree marker that is about three to four feet in length and about four inches wide will suit many types of trees. Further, the present tree marker can be customed by being colored by paint or dye or given various other markings to signify a particular owner or user of the trees and land being marked.

Figure 1:
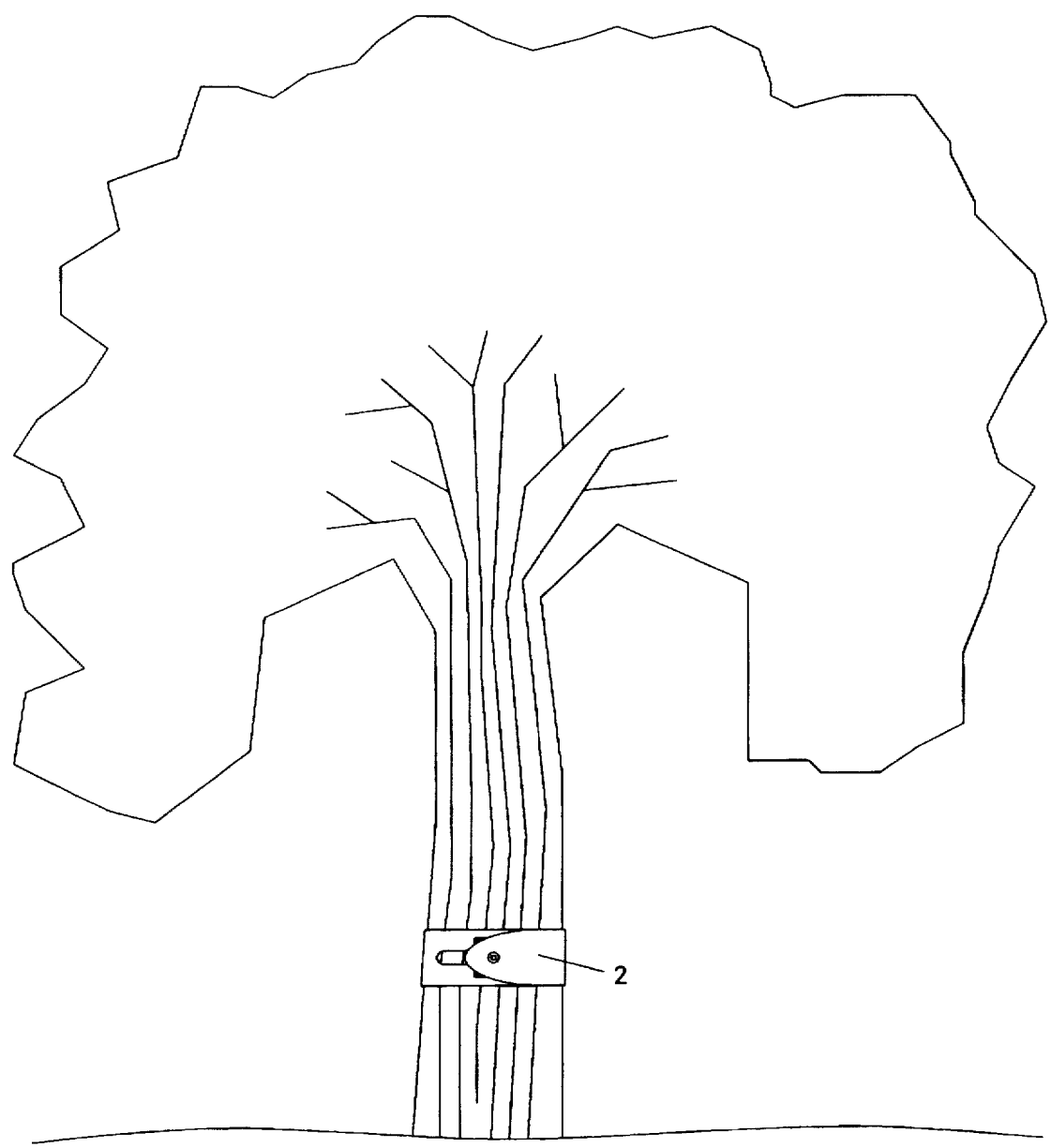
FIG. 1 shows the present tree marker in use about a tree.

FIG. 1 shows a preferred embodiment of the present tree marker in use about a tree, and the embodiment includes a three to four foot band 2. Depending upon the durability and cost needs of the particular user, the band could be made of a choice of plastic or metal material that resists deteriorating and corroding over time and is reusable. Plastic will be cheaper to mass produce, but not as durable as a metal material such as aluminum. Regardless, the band should be flexible and easily shaped to fit the circumference of a tree as the band is placed on the tree and as the tree grows. When a band will be placed on a tree for many years, a thin aluminum band would be preferred because it is flexible, durable, and does not corrode.

Figure 2:
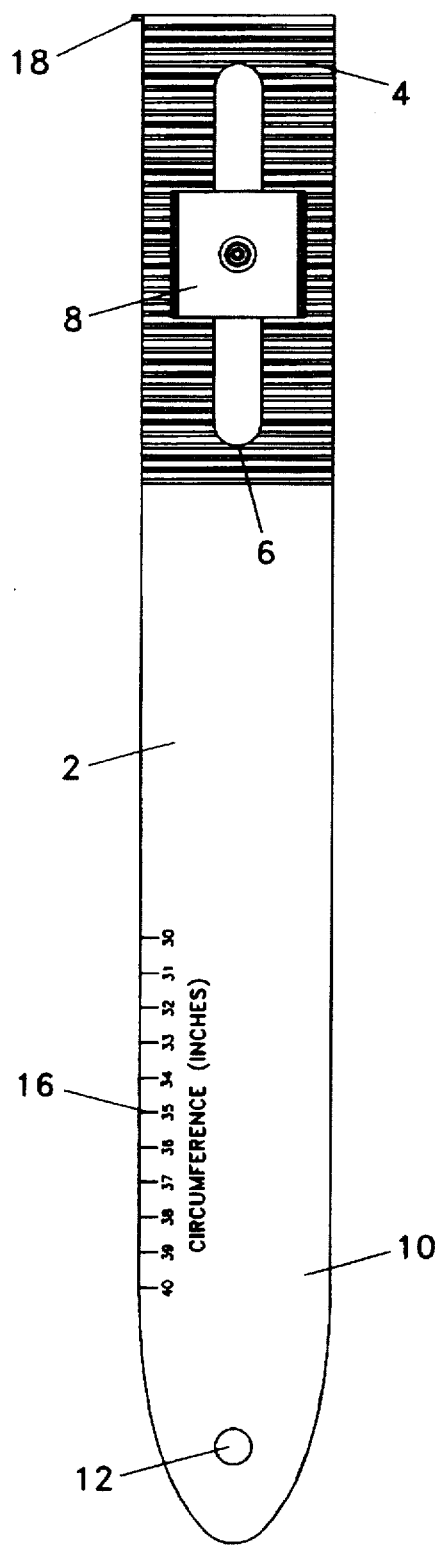
FIG. 2 is a side view of the present tree marker extended lengthwise.

As shown in more detail in FIG. 2, the preferred band includes a first end, referred to herein as a slotted end 4, having a slot 6 therein. The slotted end accommodates a slidable sheath 8 that attaches itself through the slot. Other means for attaching a sheath to an end of the band that will accomplish the desired objective may be available. For instance, the sheath could wrap completely around an end of the band to attach itself. Variations will be obvious to those skilled in the present art.

Figure 3:
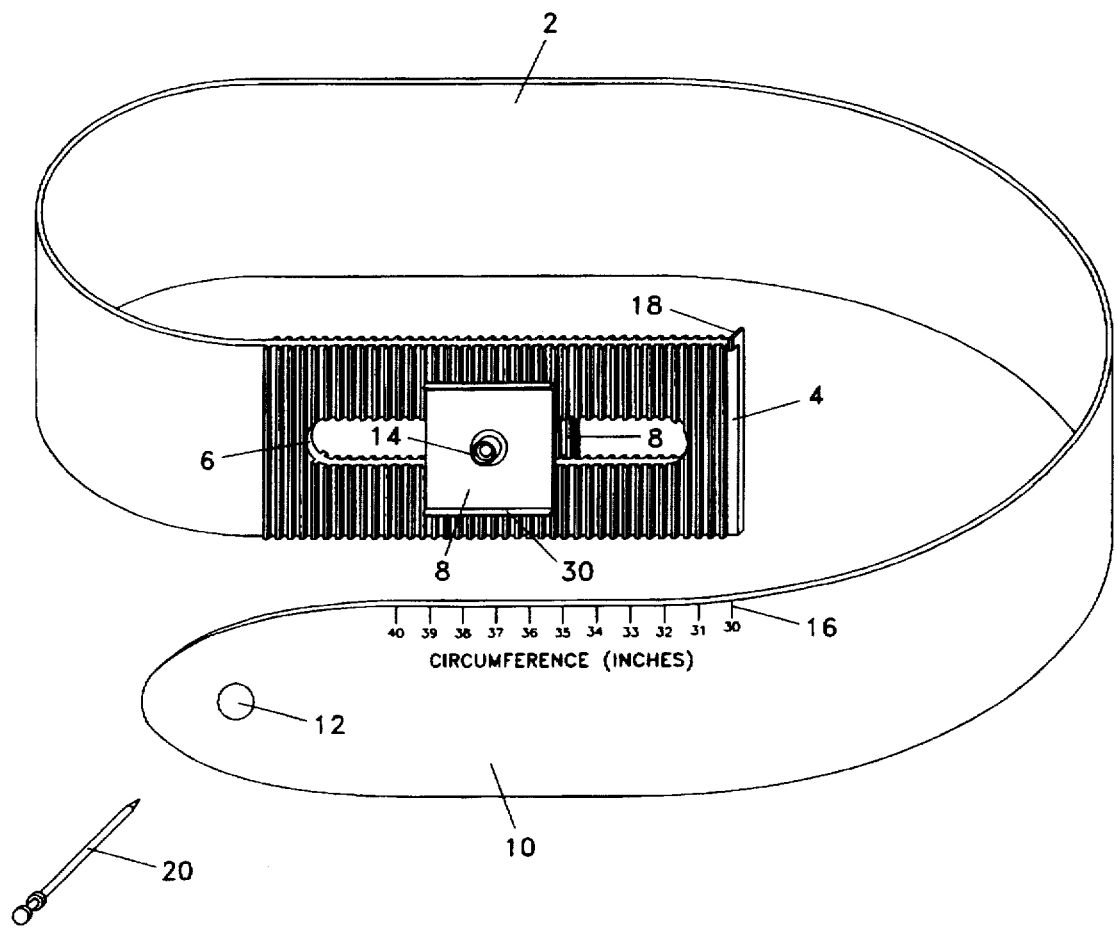
FIG. 3 is a perspective view of a tree marker constructed in accordance with the teachings of the present invention.

As FIG. 3 shows, the preferred band further has a second end, referred to herein as an unslotted end 10, that includes some type of fastener 12, preferably a standard type snap, that attaches to the sheath when the band is wrapped around a tree. The slidable sheath of the present embodiment attaches as described above through the slot 6 via a connecting device 14, such as a snap, rivet or bolt, that fits through the slot and connects the slidable sheath together such that the slotted end moves about the connecting device. In the present embodiment, a standard type snap is used as the connecting device. With this configuration, the band can slide within the sheath along the length of the slot. This sliding action permits the tree marker to adjust as a tree grows and becomes broader. The band wraps around a selected tree and forms a ring around the tree that is used for identification.

The tree marker may also be used to measure the growth of a tree. The unslotted end 10 of the tree marker may be ruled as shown by the rule marks 16, and an indicator means 18 may be added to the slotted end 4 to act as a measuring point for the circumference or diameter of a tree. The rule marks must be properly calibrated to give the desired measurement. As the tree grows and causes the band to expand, the indicator will align with a larger valued rule mark on the unslotted end and depict the present size of the tree.

To further affix the tree marker to a tree, some means such as nail 20 may be driven through the unslotted end of the band and through an aperture 22 in the sheath. The nail passes through the unslotted end, the sheath, and the slot of the slotted end and is received by the tree. Thus, the tree marker is affixed to the tree, but the band may slide through the sheath. Because iron will damage a tree and cause a tree to bleed, the nail should be aluminum, stainless steel, or some other suitable corrosion proof material. Preferably, the head of the nail will remain out of the tree several inches to allow for growth of the tree. Using a duplex nail will help to keep the head of the nail away from the tree and will help in removing the nail later. To hold the tree marker in place against the tree, a spring can be integrated with the nail. The spring loaded nail will help resist the elements of nature and maintain the tree marker's size around the tree until the tree grows and causes the tree marker to adjust.

Figure 4:
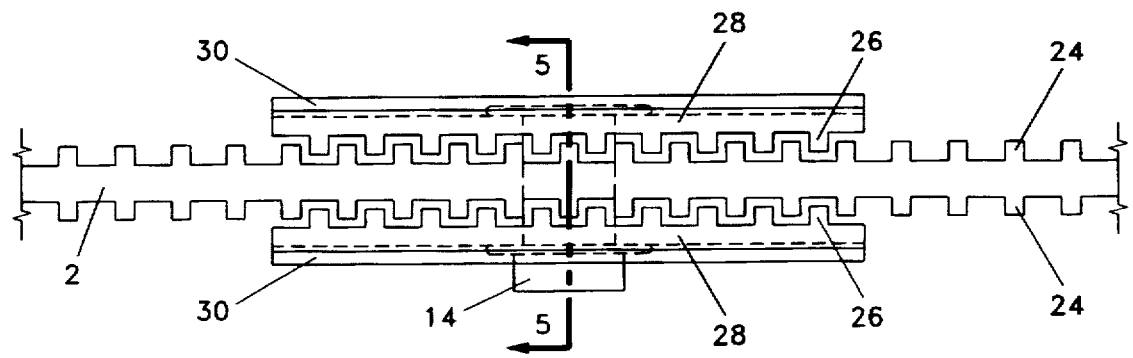
FIG. 4 is a sectional top view of a portion of the present tree marker that includes the sheath as shown in FIG. 3.

Alternatively or in combination with the nail, a means for creating resistance between the sheath and band may be employed that causes the band to maintain a tight fit about the marked tree. FIG. 4 shows in detail an example of the preferred means for creating resistance. The sheath and the band include a series of bumps or flanges 24 and 26 on each side of the sheath portions 28 that face the band and on each side of the band that faces a side of a sheath portion. These flanges engage each other and create resistance that holds the band at a particular position within the sheath. Other suitable ways of creating this resistance between the sheath and the band will be apparent to those skilled in the art. As the tree grows an exerts force against the band, the band will move within the sheath as the engaged bumps or flanges gradually permit such movement.

Figure 5:
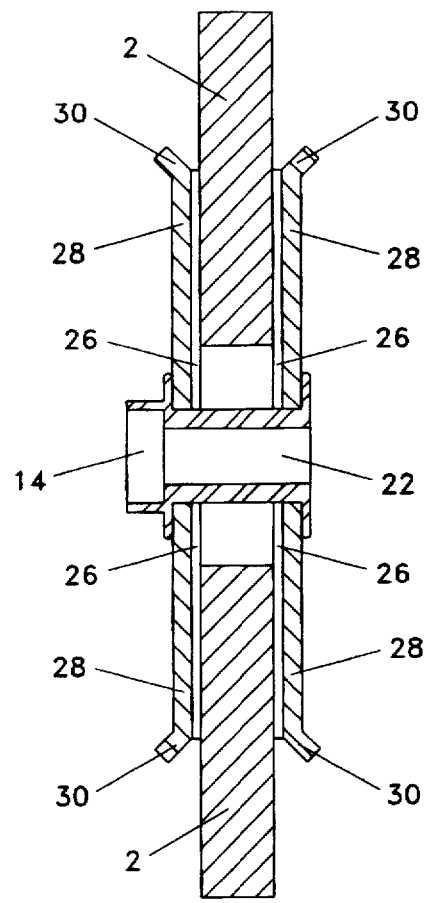
FIG. 5 is a sectional end view of the portion of the tree marker taken along lines 5—5 in FIG. 4.

The sectional end view of FIG. 5 shows the preferred sheath arrangement in more detail. As shown, the sheath portions 28 each have flared edges 30 that improve the function of the tree marker and keep the tree from growing into the band.

While preferred embodiments of the invention have been shown and described, those skilled in this art will recognize that various modifications may be made in these embodiments without departing from the spirit and scope of the present invention. Therefore, the scope of the present invention is set forth in the claims that follow.

I claim:

1. A tree marker comprising:

a band formed of a flexible and durable material, a sheath about the band, a means for connecting the sheath to the band along a first end of the band so that the sheath may slide for a fixed length along the first end, a means for connecting a second end of the band to the sheath.

2. A tree marker as set forth in claim 1, in which the first end of said band has a slot therethrough and the second end is unslotted, such that said means for connecting the sheath to the band along the said first end connects through the slot and permits the sheath to slide the length of the slot.

3. A tree marker as set forth in claim 1 that includes a means for regulating the sliding movement of said band within said sheath.

4. A tree marker as set forth in claim 3 in which the means for regulating the sliding movement of said band within said sheath comprises a series of outwardly facing flanges on said first end of said band and a series of inwardly facing flanges on said sheath that face and overlap the flanges on said first end of said band thereby creating resistance to sliding between said band and said sheath.

5. A tree marker as set forth in claim 2 that includes a means for regulating the sliding movement of said band within said sheath.

6. A tree marker as set forth in claim 5 in which the means for controlling the sliding movement of said band comprises a series of outwardly facing flanges on said first end of said band and a series of inwardly facing flanges on said sheath that face and overlap the flanges on said first end of said band thereby creating resistance to sliding between said band and said sheath.

7. A tree marker as set forth in claim 3 in which said band is about three to four feet in length and about four inches wide.

8. A tree marker as set forth in claim 3 in which said band is formed from aluminum.

9. A tree marker as set forth in claim 3 in which said band is formed from plastic.

10. A tree marker as set forth in claim 5 in which the means for connecting said sheath to said band includes a standard type snap.

11. A tree marker as set forth in claim 5 that includes a means for affixing said sheath to a tree by a nail or screw that is driven through said sheath such that the nail or screw passes through said slot of said first end so that said band is permitted to slide within said sheath without interference from the nail or screw.

12. A tree marker as set forth in claim 11 in which said means for affixing said sheath to a tree includes a duplex nail that is driven through said sheath.

13. A tree marker as set forth in claim 12 in which said duplex nail is formed of aluminum or stainless steel.

14. A tree marker as set forth in claim 3 that includes an indicator means on said first end of said band for indicating a tree's circumference by pointing to ruled marks on said second end of said band that show units of measure for circumference.

* * * * *